United States Patent [19]

Kitsuki

[11] Patent Number: 4,934,623
[45] Date of Patent: Jun. 19, 1990

[54] MECHANISM FOR PREVENTING UNINTENDED ROTATION OF REELS OF FILM STORAGE CASSETTE

[75] Inventor: Kengo Kitsuki, Shinjuku, Japan

[73] Assignee: Dai Nippon Insatsu Kabushiki Kaisha, Japan

[21] Appl. No.: 301,958

[22] Filed: Jan. 26, 1989

[30] Foreign Application Priority Data

Jan. 30, 1988 [JP] Japan .................. 63-10521

[51] Int. Cl.$^5$ .................. B65H 75/00; G03B 1/04
[52] U.S. Cl. .................................................. 242/71.2
[58] Field of Search ............... 242/71.2, 198, 199; 400/208.1; 206/387

[56] References Cited

U.S. PATENT DOCUMENTS

| | | | |
|---|---|---|---|
| 2,051,206 | 8/1936 | Fairbanks | 242/71.2 |
| 2,161,341 | 6/1939 | Fairbanks | 242/71.2 |
| 3,272,304 | 9/1966 | Morelli | 400/208.1 |
| 3,380,581 | 4/1968 | Landgraf | 400/208.1 X |
| 3,747,745 | 7/1973 | Esahi et al. | 206/387 |
| 4,067,629 | 1/1978 | Amatsu et al. | 206/387 X |
| 4,210,296 | 7/1980 | Frechette | 242/71.2 X |
| 4,304,331 | 12/1981 | Minkow | 242/199 X |

FOREIGN PATENT DOCUMENTS 62-38163  2/1987  Japan .

*Primary Examiner*—Stanley N. Gilreath
*Attorney, Agent, or Firm*—Arnold, White & Durkee

[57] ABSTRACT

A transfer printing film storage cassette comprises a cassette case, a feed reel for feeding a printing film, and a take-up reel for winding the film, both the reels being accommodated in the cassette case. The transfer printing film storage cassette is equipped with a reel rotation preventing mechanism including an elongated flat plate. The rotation preventing plate is formed with inserting protrusions each of which is removably inserted into hollow engaging portion at one end of each reel and with a pair of lateral projections disposed between the inserting protrusions and adapted to be snappingly inserted into an opening formed in an end wall of the cassette case on its operating side.

6 Claims, 2 Drawing Sheets

MECHANISM FOR PREVENTING UNINTENDED ROTATION OF REELS OF FILM STORAGE CASSETTE

BACKGROUND OF THE INVENTION

This invention relates to a film storage cassette accommodating a film used, for example, as a heat-sensitive-transfer recording medium, and more particularly, to a mechanism for preventing unintended rotation of a feed reel and a take-up reel of a transfer printing film storage cassette when it is not used.

A heat-sensitive-transfer recording device using a transfer printing film of the type as disclosed in U.S. Pat. No. 4,626,256 to Kawasaki et al. is well known. The recording device uses a transfer printing film storage cassette in which a feed reel for paying out or feeding a transfer printing film and a take-up reel for winding up the same are accommodated in a cassette case. The known transfer printing film storage cassette is usually equipped with a mechanism for preventing the transfer film from slackening due to undesired rotation of the feed reel or take-up reel at the time when the cassette is not used. One example of the rotation preventing mechanism is disclosed in, for example, Japanese Utility Model Laid-Open Publication (KOKAI) No. 38163/1987, in which projections are formed on the outer surfaces near the ends of the respective reels so that the projections are to be engageable with grooves formed at positions, corresponding to the projections, in the inner surface of the cassette case by axially shifting the respective reels by means of urging springs.

However, with the rotation preventing mechanism of the type described above, it is essential to provide projections on the outer surface of the reels and grooves in the inner surface of the cassette case, and to provide spring means for urging the reels toward the grooves. The provision of these members or means makes the structure of the cassette device cost for production of the same.

SUMMARY OF THE INVENTION

An object of this invention is to substantially eliminate the defects or drawbacks encountered in the prior art described above and to provide a simple and compact mechanism for preventing the rotation of a feed reel and a take-up reel of a film storage cassette and hence the slacking of the film contained in the cassette case.

This and other objects can be achieved according to the invention by providing a rotation preventing mechanism for a film storage cassette of the type which comprises a cassette case and feed and take-up reels accommodated in parallel disposition in the cassette case to feed and wind up a film contained in the cassette case. The cassette case has an end wall at an operating side which rotatably supports one axial end of the reels. The mechanism comprises means forming an opening in the end wall between one of the axial ends of the reels; engaging portions provided at one of the axial ends of the reels, and a rotation preventing member. The rotation preventing member includes a base part, a pair of spaced apart, first engaging means protruding from the base part and removably engaged with the engaging portions of the reels, respectively, and second engaging means on the base part detachably fitted in the opening in the end wall of the cassette case.

In a preferred embodiment of this invention, the rotation preventing member is formed as an elongated resilient plate member wherein the first engaging means are planar inserting protrusions formed on both longitudinal ends of the base part, and the second engaging means comprises a plate portion protruding transversely to the base part between the protrusions and having a pair of lateral engaging projections extending toward the inserting protrusions, respectively. The engage projections snappingly engaging the opening. The engaging portions of the reels are of hollow cylindrical shape. The inner surfaces of the engaging portions have a plurality of ribs extending in axial directions of the reels, the ribs being adapted to engage the first engaging means. The tip ends of the lateral engaging projection are spaced apart by a distance slightly larger than the longitudinal length of the opening in the end wall of the operating side of the cassette case.

According to the rotation preventing mechanism for the transfer printing film storage cassette having the structure described above, when the cassette is not used, the rotation preventing member is engaged with the cassette case in such a manner that the first engaging means of the member is inserted and fitted into the engaging portions of the feed and take-up reels. The second engaging means are also fitted in the opening in the end wall of the operating side of the cassette case, whereby the rotation preventing member, detachably secured to the cassette case, effectively prevents unintended rotation of the reels and hence slackening of the transfer printing film.

A preferred embodiment according to this invention will be described further in detail below with reference to the accompanying drawings.

DESCRIPTION OF THE PREFERRED EMBODIMENT

Figure 1:
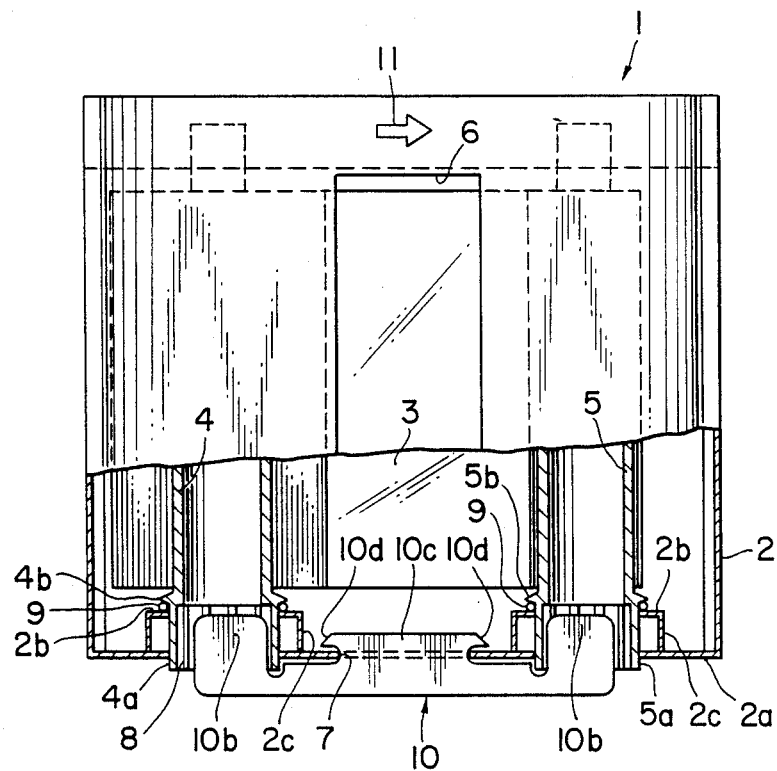
FIG. 1 is a plan view, partially in section, of a transfer printing film storage cassette equipped with a rotation preventing mechanism according to this invention.
Figure 2:
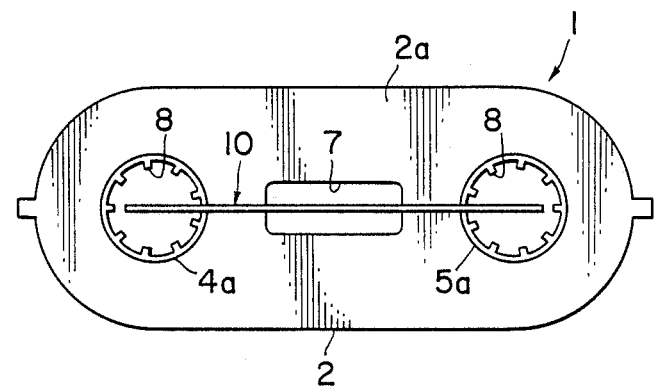
FIG. 2 is an end view of the cassette shown in FIG. 1.
Figure 3:
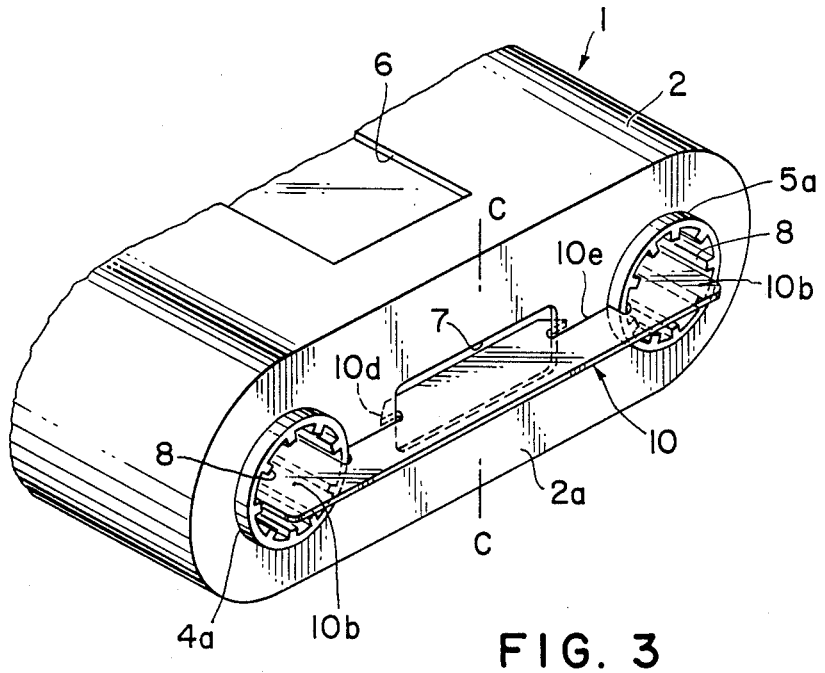
FIG. 3 is a fragmentary perspective view of the cassette shown in FIG. 1.

Referring to FIGS. 1 to 3, a transfer printing film storage cassette generally designated by reference numeral 1 comprises a cassette case 2, a transfer printing film 3 accommodated in the case 2, a feed reel 4 for paying out or feeding the transfer film 3, and a take-up reel 5 for winding up the transfer film 3, both the reels being rotatably mounted in the cassette case 2. The cassette case 2 is provided with wide windows 6 on the upper and lower surfaces thereof, as viewed in FIG. 1, through which the transfer printing film 3 is exposed. The cassette case 2 is also provided with an end wall structure 2a at a driving or operating side. An elongated opening 7 is formed in the end wall structure 2a at substantially the central portion thereof. The opening 7 may be of rectangular shape, as shown. The feed reel 4 and the take-up reel 5 have cylindrical, hollow engaging portions 4a and 5a extending outwardly from the end wall 2a. The engaging portions 4a and 5a and the opening 7 are arranged in symmetrical relation with respect to a centerline C-C shown in FIG. 3.

Both the feed reel 4 and the take-up reel 5 are rotatably mounted in parallel in the cassette case 2, and on the inner surfaces of the cylindrical engaging portions 4a and 5a of the respective reels are formed a plurality of projections, i.e. ribs 8, extending in the axial directions of the reels. The ribs 8 are provided for the purpose of engaging and transmitting the rotation of rotary driving shafts of a printer, not shown, when the cassette is to be used with the printer.

Annular beads 4b and 5b are formed on the outer peripheral surfaces of the respective reels 4 and 5, as shown in FIG. 1, for the purpose of preventing the slipping out thereof, and ring members 9 having a large friction coefficient such as rubber rings are disposed between the beads 4b and 5b and the inner surfaces 2b of bearing portions 2c of the end wall structure 2a. Biasing means, such as leaf or coil springs, not shown, are disposed at the side of the cassette case 2 opposite the operating side for urging the feed and take-up reels toward the operating side thereof, and due to the provision of such biasing means, the rubber rings 9 are pressed against the inner surfaces of the bearing portions 2c by the annular beads 4b and 5b. The biasing means may be formed independently from the feed reel and the take-up reel or integrally therewith as disclosed in Japanese Utility Model Laid-Open Publication (KOKAI) No. 38163/1987.

Figure 4:
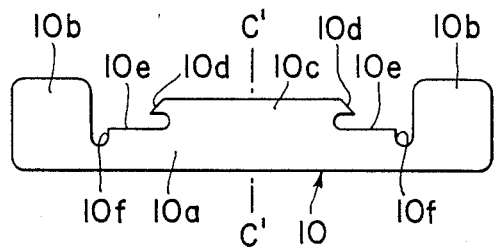
FIG. 4 is a plan view of a rotation preventing plate of the rotation preventing mechanism.

In order to prevent unintended rotation of the feed and take-up reels, a rotation preventing mechanism is utilized which includes a rotation preventing plate 10 constructed for this purpose according to this invention. FIG. 4 shows a plan view of the rotation preventing plate 10, which has substantially a symmetrical structure with respect to a centerline C'—C' and has a base part 10a, a pair of planar end protrusions 10b to be inserted into the engaging portions 4a and 5a of the reels, respectively, and a plate portion 10c protruding transversely to the base part 10a between the protrusions 10b. The plate portion 10c having opposite lateral engaging projections 10d extending toward the respective end protrusions 10b. The plate 10 further has abutting edges 10e and cutouts 10f adjoining the protrusions 10b.

The respective end protrusions 10b have a shape or size capable of being inserted into the engaging portions 4a and 5a of the feed and take-up reels 4 and 5 as shown in FIG. 1, and have a width capable of being engaged with the ribs 8 formed on the inner surfaces of the engaging portions when the end protrusions 10b of the rotation preventing plate 10 are inserted into the engaging portions 4a and 5a, to thereby prevent unintended rotation of the reels. The lateral projections 10d are formed such that the tip ends of the respective projections 10d are spaced by a distance slightly larger than the longitudinal size of the opening 7 formed in the end wall structure 2a of the cassette case 2, so as to be firmly and snappingly engaged behind the inner surface of the end wall 2a to prevent the rotation preventing plate 10 from falling out, when the projections 10d are snappingly pressed into the opening 7. It is preferred for this purpose to make the rotation preventing plate 10 of a plastic material having a suitable resiliency or elasticity.

A film contained in the cassette case 2 is wound up in a direction shown by an arrow 11 in FIG. 1.

According to the transfer printing film storage cassette 1 having the structure described above, when the cassette 1 is not used in the printer, the rotation preventing plate 10 is fitted in the feed reel 4 and take-up reel 5 in such a manner that the end protrusions 10b are inserted into the engaging portions 4a and 5a of the respective reels. The projections 10d formed on the rotation preventing plate 10 are fitted behind the edges of the opening 7 formed in the end wall structure 2a so that the inserted end protrusions 10b can be firmly engaged with the ribs 8 on the inner surfaces of the feed reel 4 and the take up reel 5. Thus unintended rotation thereof and the slacking of the transfer printing film in the cassette case 2 can be prevented.

When it is required to use the transfer printing film storage cassette 1, the cassette 1 will become usable by merely removing the rotation preventing plate 10 from the engaging portions of the respective reels and setting the cassette 1 in the transfer recording device. Even in the condition in which the rotation preventing plate 10 is removed, the annular beads 4b and 5b of the feed and take-up reels 4 and 5 are pressed by a spring force against the inner surfaces 2b of the bearing portions 2c of the cassette case 2 through the rubber rings 9 to prevent the rotation of the respective reels due to the frictional force between the inner surfaces 2b and the rubber rings 9, whereby slackening of the transfer printing film can be prevented.

In the preferred embodiment of the invention described above, the rotation preventing mechanism is provided with the rubber rings 9 in addition to the rotation preventing plate 10, but the rubber rings are not essential to the structure of this invention and may be eliminated.

It is to be noted that this invention is not limited to the described preferred embodiment and many modifications and changes may be made within the spirits or scopes defined in the appended claims. For example, this invention can be applied to any type of film storage cassettes other than the transfer printing film storage cassette as disclosed herein.

What is claimed is:

1. A mechanism for preventing unintended rotation of reels in a film storage cassette which comprises a cassette case having feed and take-up reels accommodated in spaced disposition therein to feed and wind-up, respectively, a film contained in the cassette case, said cassette case having an end wall at an operating side thereof which rotatably supports axial ends of each of said reels, said mechanism comprising:
   an opening between said reels defined by said end wall, said opening having engaging ends at portions thereof adjoining each of said axial ends of the reels;
   engaging ribs axially extending from the reels at each of said axial ends of the reels; and
   a rotation preventing member consisting of a resilient flat plate member disposed substantially perpendicular to said end wall of said cassette case, said plate member comprising:
   (i) an elongated base portion having abutting edges which abuttingly contact said end wall of said cassette case;
   (ii) a pair of planar protrusions, each consisting of a tab, extending transversely from said base portion at two longitudinal ends thereof and being removably engaged with said engaging ribs of the respective reels; and
   (iii) an elongated intermediate plate portion protruding transversely from said base portion between said abutting edges of said base portion and having engaging projections at opposing longitudinal ends thereof extending toward said planar protrusions, respectively, said engaging projections snappingly engaging said engaging ends of said opening, respectively to hold said plate member on said end wall of said cassette case;

wherein said abutting edges of said base portion are arranged between said planar protrusions and said engaging projections of said plate portion and said engaging projections engage behind said engaging ends of said opening when said abutting edges are in abutting contact with said one wall.

2. The rotation preventing mechanism of claim 1, wherein tip ends of said engaging projections that are nearest said planar protrusions, respectively, are spaced apart from each other by a distance slightly larger than a distance between said engaging ends of said opening.

3. The rotation preventing mechanism of claim 1, wherein said engaging ribs of said reels are symmetrical with respect to a centerline of said opening of said end wall that is located within the plane of said end wall and is perpendicular to said plate member, and said planar protrusions and said engaging projections are symmetrical with respect to a centerline of said plate member located within the plane of said plate member.

4. The rotation preventing mechanism of claim I, wherein said plate member consists of a plastic material.

5. The rotation preventing mechanism of claim 1, wherein each of said abutting edges has a cutout adjoining each of said planar protrusions.

6. A film storage cassette comprising:
a cassette case having feed and take-up reels accommodated in spaced disposition therein to feed and wind-up, respectively, a film contained in said cassette case, and an end wall at an operating side thereof which rotatably supports axial ends of each of said reels;
bearing members, disposed about each of said reels at said axial ends of said reels, which contact an inner surface of said end wall;
first means for preventing unintended rotation of said reels in said cassette comprising:

(i) annular beads formed on an outer peripheral surface of each of said reels at said axial end of each of said reels, and
(ii) ring members having a large coefficient of friction interposed between said annular beads and an inner surface of said bearing members, a biasing means urges said reels towards said end wall, whereby said annular beads press said ring members against said inner surface of said bearing members; and
second means for preventing unintended rotation of said reels in said cassette comprising:
(i) an opening between said reels defined by said end wall, said opening having engaging edges at portions thereof adjoining each of said axial ends of the reels;
(ii) engaging ribs axially extending from the reels at each of said axial ends of the reels; and
(iii) a rotation preventing member consisting of a resilient flat plate member disposed substantially perpendicular to said end wall of said cassette case, said plate member comprising:
an elongated base portion having abutting edges which abuttingly contact said end wall of said cassette case;
a pair of planar protrusions, each consisting of a tab, extending transversely from said base portion at two longitudinal ends thereof and being removably engaged with said engaging ribs of the respective reels; and
an elongated intermediate plate portion protruding transversely from said base portion between said abutting edges of said base portion and having engaging projections at opposing longitudinal ends thereof extending toward said planar protrusions, respectively, said engaging projections snappingly engaging said engaging ends of said opening, respectively, to hold said plate member on said end wall of said cassette case;
wherein said abutting edges of said base portion are arranged between said planar protrusions and said engaging projections of said plate portion and said engaging projections engage behind said engaging ends of said opening when said abutting edges are in abutting contact with said end wall.

* * * * *